(12) United States Patent
Wu

(10) Patent No.: US 11,387,035 B2
(45) Date of Patent: Jul. 12, 2022

(54) WIRELESS CHARGING COIL

(71) Applicant: HOLYGO CORPORATION, Taipei (TW)

(72) Inventor: Chien-Te Wu, Taipei (TW)

(73) Assignee: HOLYGO CORPORATION, Taipei (TW)

( * ) Notice: Subject to any disclaimer, the term of this patent is extended or adjusted under 35 U.S.C. 154(b) by 399 days.

(21) Appl. No.: 16/455,338

(22) Filed: Jun. 27, 2019

(65) Prior Publication Data

US 2020/0005991 A1 Jan. 2, 2020

(30) Foreign Application Priority Data

Jun. 27, 2018 (TW) .................................. 107122048

(51) Int. Cl.
*H01F 27/28* (2006.01)
*H02J 7/02* (2016.01)
*H02J 50/10* (2016.01)
*H02J 7/00* (2006.01)
*H01F 27/36* (2006.01)

(52) U.S. Cl.
CPC ....... *H01F 27/2804* (2013.01); *H01F 27/366* (2020.08); *H02J 7/0042* (2013.01); *H02J 7/025* (2013.01); *H02J 50/10* (2016.02); *H01F 2027/2809* (2013.01)

(58) Field of Classification Search
CPC .......... H01F 27/2804; H01F 2027/2809; H02J 50/10; H02J 7/0042; H02J 7/025
USPC ......................................................... 336/200
See application file for complete search history.

(56) References Cited

U.S. PATENT DOCUMENTS

| | | | |
|---|---|---|---|
| 10,622,820 B2* | 4/2020 | Jol | H04B 5/0075 |
| 2015/0076919 A1* | 3/2015 | Park | H01F 38/14 336/200 |
| 2017/0178802 A1* | 6/2017 | Yang | H02J 50/10 |
| 2017/0201114 A1* | 7/2017 | Chang | H02J 7/0042 |
| 2017/0345555 A1* | 11/2017 | Jang | H02J 50/10 |
| 2017/0358955 A1* | 12/2017 | Feng | H01F 27/2804 |
| 2019/0140481 A1* | 5/2019 | Keeling | H02J 50/60 |

* cited by examiner

*Primary Examiner* — Alfonso Perez Borroto
(74) *Attorney, Agent, or Firm* — Maschoff Brennan

(57) ABSTRACT

The present disclosure provides a wireless charging coil, and the wireless charging coil comprises a first coil layer, a second coil layer and a first magnetic material. The second coil layer is stacked in parallel on a surface of the first coil layer to form a stacked structure, and it has a winding path identical to a winding path of the first coil layer. The first magnetic material is disposed on one side of the first coil layer and has a winding path which is different from the winding path of the first coil layer and with said side away from the second coil layer. Currents generated by a power source are evenly distributed in the stack structure to reduce a skin effect when the wireless charging coil is electrically connected to the power source.

9 Claims, 5 Drawing Sheets

WIRELESS CHARGING COIL

CROSS-REFERENCE TO RELATED APPLICATIONS

This non-provisional application claims priority under 35 U.S.C. § 119(a) on Patent Application No(s). 107122048 filed in Taiwan on Jun. 27, 2018, the entire contents of which are hereby incorporated by reference.

BACKGROUND OF THE INVENTION

Technical Field of the Invention

The present disclosure is related to a coil, and more particularly to a wireless charging coil.

Description of the Related Art

In order to making electronic products (such as laptops) that may be used more conveniently, more and more electronic products are designed to have wireless charging coils, and electromagnetic inductions of the wireless charging coils may charge a battery of electronic products.

In the fields of radio frequency, microwave circuit and power transmission system, an influence of a skin effect should be considered. The skin effect is based on a skin depth δ, and the definition of the skin depth is listed in formula (1):

$$\delta = \sqrt{\frac{2\rho}{\omega\mu}} \qquad \text{formula (1)}$$

δ: a resistivity of a conductor; ω: an angular velocity of an alternating current; f: an angular frequency of an alternating circuit, wherein ω=2π*f; μ: absolute magnetic permeability.

According to the formula (1), the skin depth δ is smaller when the frequency of the current is higher. Currents transmitted to the wire concentrate on a surface of the wire to affect a conduction efficiency of the currents more seriously when the skin depth δ is smaller.

A speed for processing data will be faster in the future because electronic products will have a great chance to be operated at a high voltage, a high current or a high frequency. As a result, the skin effect produced by electronic products will be significant, and the skin effect is indeed a factor that may not be ignored by developers.

In view of the foregoing situations, there is indeed a need for a wireless charging coil for reducing the skin effect, which at least may improve above shortcomings.

SUMMARY OF THE INVENTION

The present disclosure provides a wireless charging coil in accordance with an embodiment, which may reduce a skin effect by a coil stacked structure.

The present disclosure provides a wireless charging coil in accordance with an embodiment, and the wireless charging coil comprises: a first coil layer; a second coil layer stacked in parallel on a surface of the first coil layer to form a stacked structure, and the second coil layer having a winding path identical to a winding path of the first coil layer; and a first magnetic material disposed on one side of the first coil layer and having a winding path which is different from the winding path of the first coil layer, with said side away from the second coil layer; when the wireless charging coil is electrically connected to the power source, currents generated by a power source are evenly distributed in the stack structure to reduce a skin effect.

The present disclosure provides a wireless charging coil in accordance with an embodiment, and the wireless charging coil comprises: a coil layer; and a magnetic material connected to a surface of the coil layer; when the wireless charging coil is electrically connected to a power source, the magnetic material is configured to concentrate a magnetic energy so that currents generated by the power source is evenly distributed on the coil layer to reduce a skin effect, and the coil layer is configured to stack on a surface of another coil layer to form a stacked structure such that the currents generated by the power source is evenly distributed on the two coil layers to reduce the skin effect.

The present disclosure provides a wireless charging coil in accordance with an embodiment, and the wireless charging coil comprises: a first coil layer; a first magnetic material disposed on one side of the first coil layer and having a winding path which is different from a winding path of the first coil layer; and a signal guiding member connected between the first coil layer and the first magnetic material. When the wireless charging coil is electrically connected to a power source, a second coil layer, a graphite layer or a second magnetic material may be stacked on a surface of the first coil layer to form a stacked structure, and currents generated by the power source is evenly distributed on the stacked structure to reduce a skin effect.

The wireless charging coil of the present disclosure has a coil stacked structure. When the wireless charging coil is connected to the power source, the coil stacked structure allows currents to be evenly distributed to each coil layer for reducing the skin effect. In this way, the coil stacked structure may reduce the skin effect even under a high voltage, a high frequency or a high current working condition. Compared with a current wireless charging coil in the market, the wireless charging coil of the present disclosure has a higher current transmission efficiency and a lower manufacturing cost due to the reduction of the skin effect.

The above description of the disclosure and the following descriptions of the embodiments of the present disclosure are intended to illustrate and explain spirits and principles of the present disclosure.

BRIEF DESCRIPTION OF THE DRAWINGS

The present disclosure will become more fully understood from the detailed description given herein below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
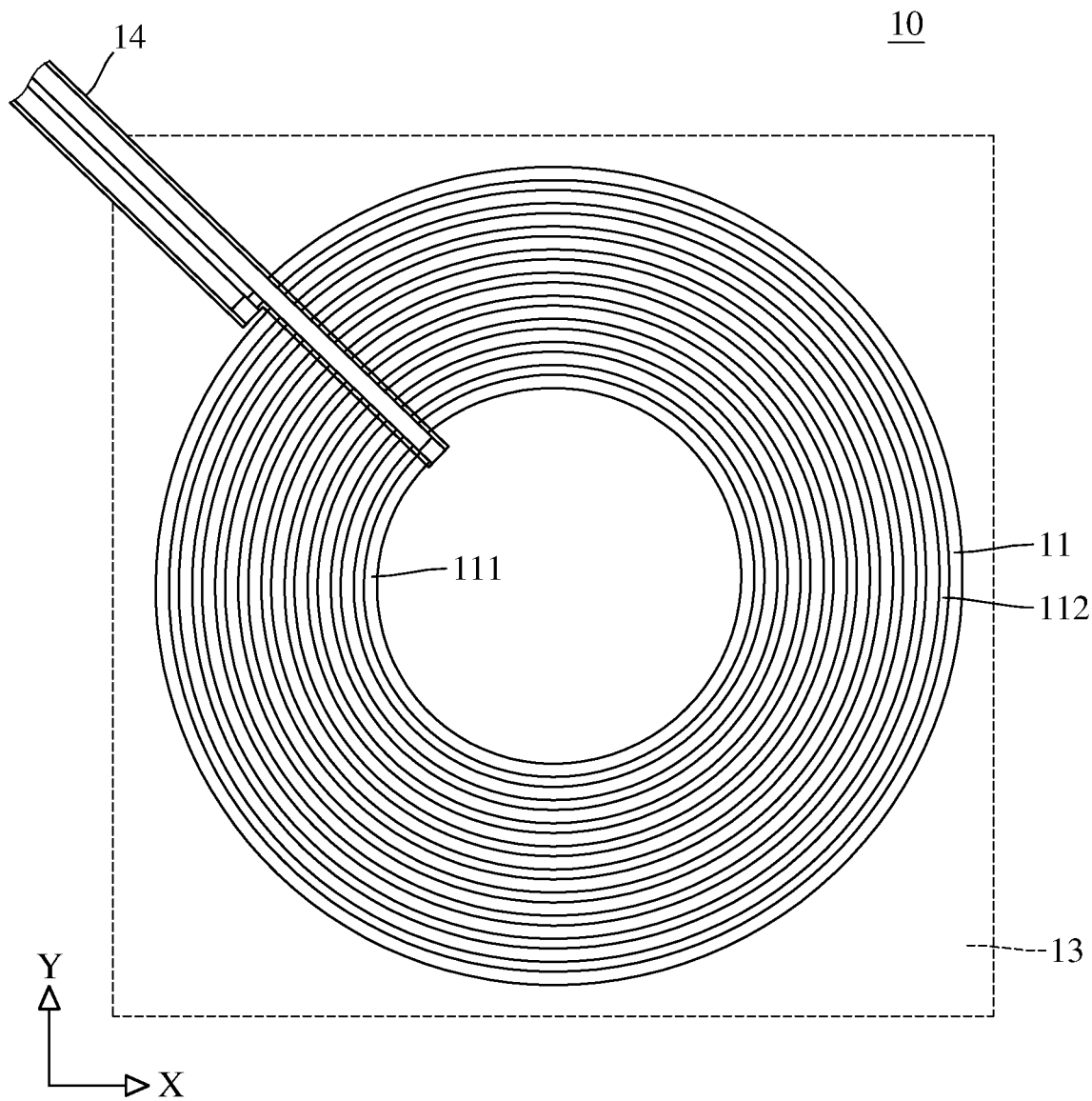
FIG. 1 is a bottom view of a wireless charging coil in accordance with a first embodiment of the present disclosure.
Figure 2:
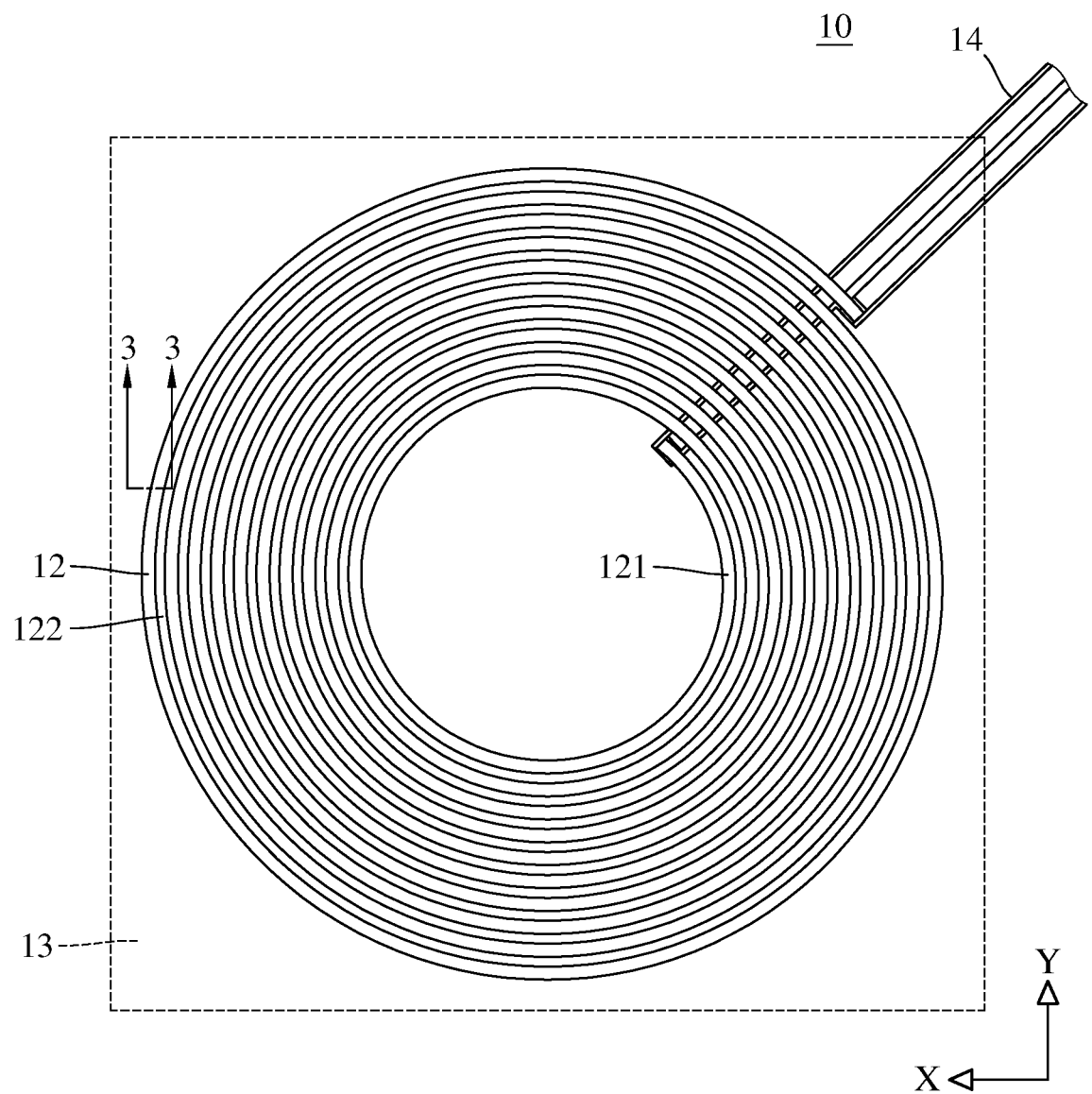
FIG. 2 is a top view of a wireless charging coil in accordance with a first embodiment of the present disclosure.

FIG. 1 is a bottom view of a wireless charging coil in accordance with a first embodiment of the present disclosure, and FIG. 2 is a top view of a wireless charging coil in accordance with a first embodiment of the present disclosure. The wireless charging coil 10 is a magnetic induction coil, and the wireless charging coil 10 includes two coil layers 11 and 12 and a plate-shaped first magnetic material 13 (indicated by a broken line), and the coil layers 11 and 12 have an identical winding path and thickness. The coil layers 11 and 12 are respectively mounted parallel to a direction of a XY plane, the coil layer 12 is stacked on the coil layer 11 along a Z-axis direction (as shown in FIG. 2) and the two coil layers 11 and 12 have the same winding path. In this embodiment, the winding path is a spiral path and the number of coil layers of is not limited. The coil layers 11, 12 have an identical spiral path, wherein the coil layer 11 has a plurality of spiral coil segments 111, and one end portion of each of the coil segments 111 is connected to one end portion of another adjacent coil segment 111. The coil layer 12 has a plurality of coil segments 121, and one end portion of each of the coil segments 121 is connected to one end portion of another adjacent coil segment 121. The two coil layers 11, 12 respectively have two corresponding spiral-shaped holes 112, 122, and each of the holes 112, 122 exemplarily may have an identical width. Because the coil layers 11 and 12 have the same winding path and are electrically connected to each other in parallel, so the wireless charging coil 10 does not generate a voltage doubling effect.

Figure 3:
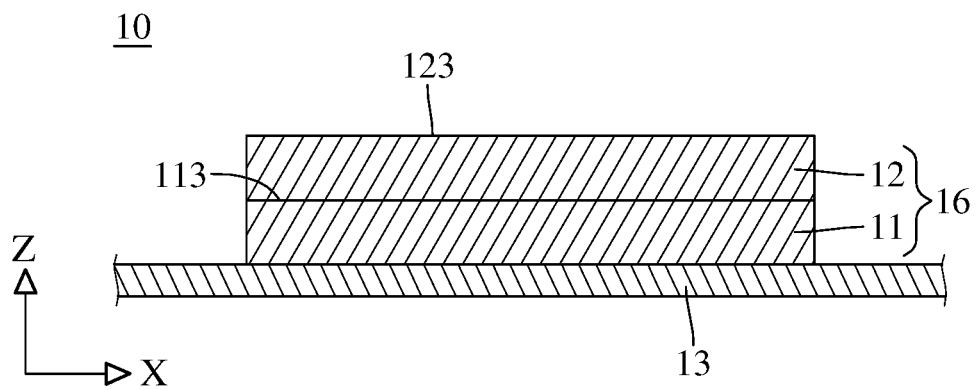
FIG. 3 is a cross section view of a coil segment of a wireless charging coil along line 3-3 of FIG. 2 in accordance with a first embodiment of the present disclosure.

FIG. 3 is a cross section view of a coil segment of a wireless charging coil along line 3-3 of FIG. 2 in accordance with a first embodiment of the present disclosure. Referring to FIG. 1 to FIG. 3, the wireless charging coil 10 further includes a signal guiding member 14. The first magnetic material 13 may be, for example, ferrites or nanocrystals. The magnetic material 13 may concentrate magnetic field lines in a region which is in a vicinity of the coil layers 11, 12 to prevent the magnetic lines from diverging. In addition, when the wireless charging coil 10 is used as a Rx terminal, the first magnetic material 13 may also shield the magnetic field lines to prevent the magnetic field lines from interfering with other electronic components in the electronic device. The width of each coil segment 111 and the width of each coil segment 121 are the same. The two coil layers 11, 12 are made of a copper with an identical thickness. In other embodiments, thicknesses of coppers of the two coil layers 11, 12 may be different.

The coil layer 12 is stacked on a surface 113 of the coil layer 11 along a Z-axis direction and the two coil layers 11, 12 are fixed each other by an insulating paste (not shown). The signal guiding member 14 is electrically connected to the two coil layers 11 and 12 and disposed between the first magnetic material 13 and the coil layer 11. The winding path of the first magnetic material 13 is different from the winding paths of the two coil layers 11, 12, and the thickness of the first magnetic material 13 is smaller than the thickness of the coil layer 11 or the coil layer 12. In other embodiments, the thickness of the first magnetic material 13 may be greater than or equal to the thickness of the coil layer 11 or the coil layer 12.

When the wireless charging coil 10 is electrically connected to a power source, a coil stacked structure 16 formed by the two coil layers 11 and 12 may uniformly distribute currents generated by the power source to the two coil layers 11 and 12. Moreover, the magnetic material 13 may assist to distribute the currents uniformly to the two coil layers 11 and 12 because the magnetic material 13 may concentrate the magnetic field lines in the region which is in the vicinity of the coil layers 11 and 12 to prevent the magnetic lines from diverging.

Under a condition of a constant thickness of the wireless charging coil 10, when widths of gaps of the wireless charging coil 10 are reduced, a width of the coil layer 11 and a width of the coil layer 12 are relatively increased, which will reduce a AC impedance of the wireless charging coil 10. However, the width of the gap of the wireless charging coil 10 has a minimum limit during the manufacture process of the wireless charging coil 10. Therefore, the stacking structure of the wireless charging coil 10 provided by our present invention can increase the widths of the coil layers 11 and 12 to decrease the AC impedance of the wireless charging coil 10 without changing the widths of the gaps of the wireless charging coil 10.

In another embodiment, the wireless charging coil 10 further comprises a second magnetic material which is stacked on the coil layer 12, which may greatly increase an inductance value of the wireless charging coil 10. For example, an inductance value of the wireless charging coil which is not provided with the second magnetic material is 8.8274 uH. In this embodiment, the inductance value of the wireless charging coil 10 which is provided with the second magnetic material is 9.3110 uH.

Figure 4:
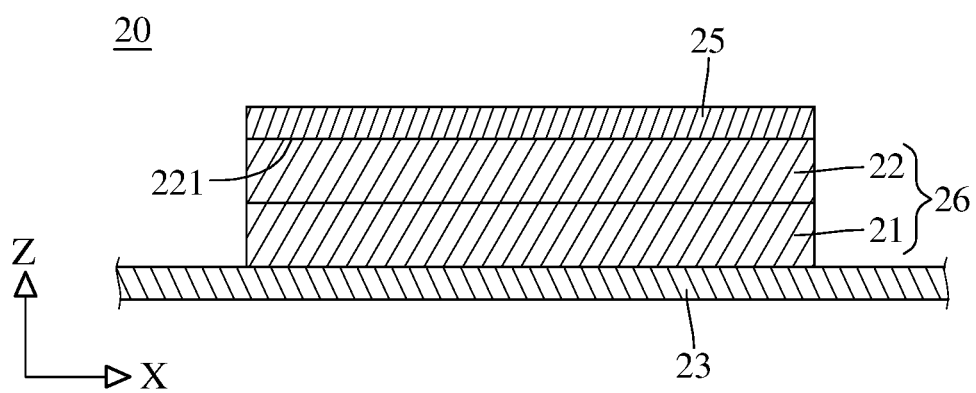
FIG. 4 is a cross section view of a coil segment of a wireless charging coil in accordance with a second embodiment of the present disclosure.

FIG. 4 is a cross section view of a coil segment of a wireless charging coil in accordance with a second embodiment of the present disclosure. As shown in FIG. 4, a wireless charging coil 20 includes two coil layers 21 and 22, a first magnetic material 23 and a graphite layer 25. The first magnetic material 23 may be, for example a ferrite or nanocrystal. The two coil layers 21 and 22 are made of a copper with an identical thickness and the two coil layers 21 and 22 have the same winding path. In other embodiments, thicknesses of coppers of the two coil layers 21, 22 may be different. The coil layer 22 is stacked on a surface 211 of the coil layer 21 along the Z-axis direction and the two coil layers 21 and 22 are fixed each other by an insulating paste (not shown). A signal guiding member is electrically connected to the two coil layers 21 and 22 and disposed between the first magnetic material 23 and the coil layer 21. The winding path of the first magnetic material 23 is different from the winding paths of the two coil layers 21 and 22, and the thickness of the first magnetic material 23 is smaller than the thickness of the coil layer 21 or the coil layer 22. In other embodiments, the thickness of the first magnetic material 23 may be greater than or equal to the thickness of the coil layer

21 or 22. The graphite layer 25 is stacked on a surface 221 of the coil layer 22 and has a winding path identical to the winding path of the coil layer 21. When the wireless charging coil 20 is electrically connected to a power source, a coil stacked structure 26 formed by the two coil layers 21 and 22 allows currents generated by the power source to be evenly distributed to the coil layers 21 and 22. In addition, the function of the graphite layer 25 is to substantially reduce the time required for reaching a thermal equilibrium of the wireless charging coil. For example, it takes 34 minutes for reaching the thermal equilibrium of the wireless charging coil without the graphite layer 25. In this embodiment, the wireless charging coil with the graphite layer 25 only needs to take 21 minutes for reaching the thermal equilibrium of the wireless charging coil.

Figure 5:
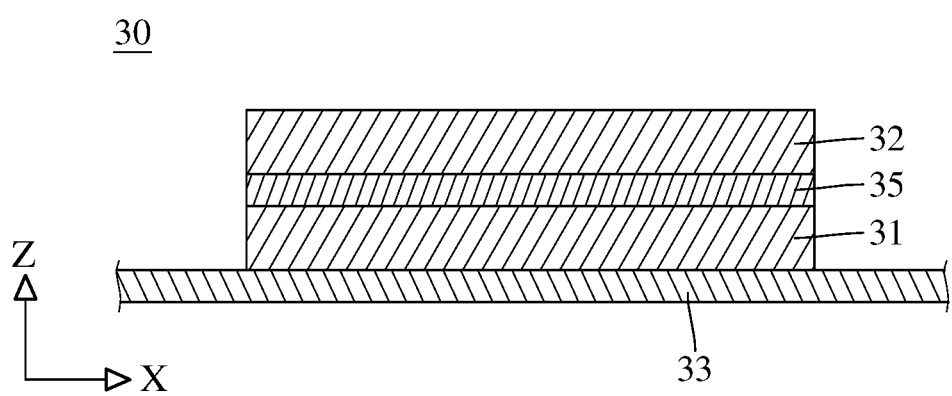
FIG. 5 is a cross section view of a coil segment of a wireless charging coil in accordance with a third embodiment of the present disclosure.

FIG. 5 is a cross section view of a coil segment of a wireless charging coil in accordance with a third embodiment of the present disclosure. As shown in FIG. 5, a wireless charging coil 30 includes two coil layers 31 and 32, a first magnetic material 33 and a second magnetic material 35. The structure of the wireless charging coil 30 is substantially similar as that of the wireless charging coil 10, and a difference between the wireless charging coils 10 and 30 is that the second magnetic material 35 is connected between the two coil layers 31 and 32. In this embodiment, the winding path of the second magnetic material 35 is the same as those of the two coil layers 31 and 32. Because the winding paths of the coil layer 31, the coil layer 32, and the second magnetic material 35 are the same, the inductance and magnetic line transmission distance of the wireless charging coil 30 can be increased.

Figure 6:
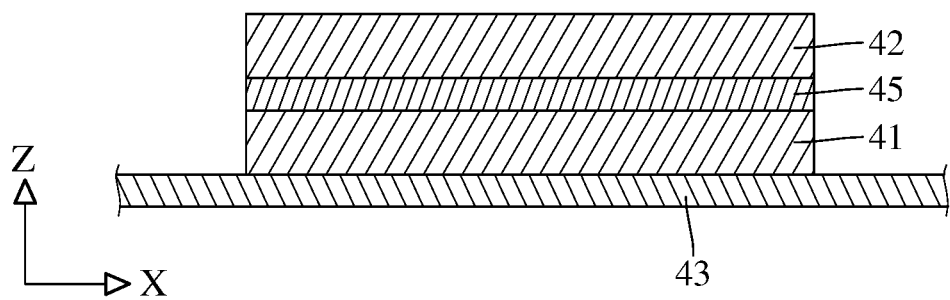
FIG. 6 is a cross section view of a coil segment of a wireless charging coil in accordance with a fourth embodiment of the present disclosure.

FIG. 6 is a cross section view of a coil segment of a wireless charging coil in accordance with a fourth embodiment of the present disclosure. As shown in FIG. 6, a wireless charging coil 40 includes two coil layers 41 and 42, a first magnetic material 43 and a graphite layer 45. The structure of the wireless charging coil 40 is substantially similar as that of the wireless charging coil 10, and a difference between the wireless charging coils 10 and 40 is that the graphite layer 45 is connected between the two coil layers 41 and 42.

The graphite layer 45 and the two coil layer 41 and 42 have the same winding path, so the quality factor Q of the wireless charging coil 40 can be increased and the AC impendence of the wireless charging coil 40 can be decreased.

Figure 7:
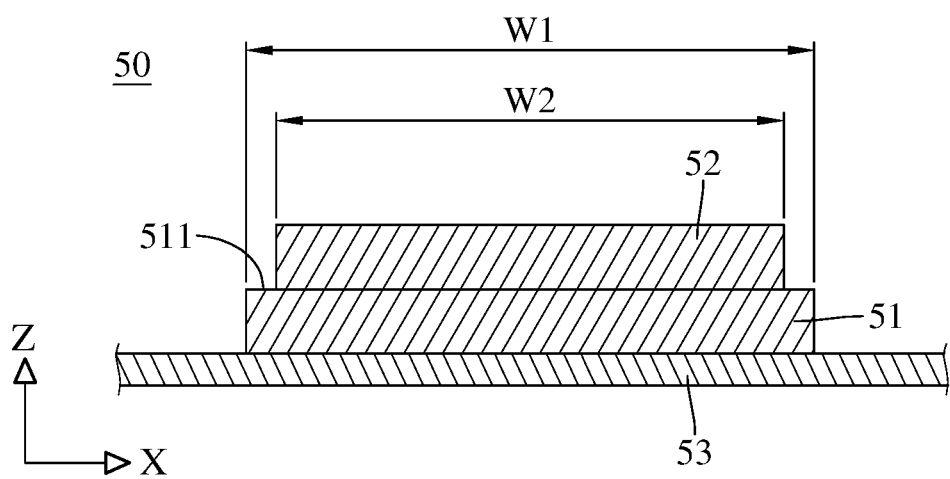
FIG. 7 is a cross section view of a coil segment of a wireless charging coil in accordance with a fifth embodiment of the present disclosure.

FIG. 7 is a cross section view of a coil segment of a wireless charging coil in accordance with a fifth embodiment of the present disclosure. As shown in FIG. 7, a wireless charging coil 50 includes two coil layers 51 and 52, and a first magnetic material 53. The two coil layers 51 and 52 are made of a copper with an identical thickness, the two coil layers 51 and 52 have the same winding path, but each coil segment of the coil layer 51 and each coil segment of the coil layer 52 respectively have a width W1 and a width W2, wherein the width W1 is greater than the width W2, the first magnetic material 53 may be, for example, a ferrite or nanocrystal. In other embodiment, the thickness of the copper of the two coil layers 51 and 52 may be different. The coil layer 52 is stacked on a surface 511 of the coil layer 51 along the Z-axis direction. A signal guiding member is electrically connected to the two coil layers 51 and 52 and disposed between the first magnetic material 53 and the coil layer 51, which can avoid the signal guiding member from damage due to external forces. The width of the first magnetic material 53 is larger than the widths of the two coil layers 51 and 52, and the thickness of the first magnetic material 53 is smaller than the thickness of the coil layer 51. In other embodiments, the thickness of the first magnetic material 53 may be larger than or equal to the thickness of the coil layer 51. When the wireless charging coil 50 is electrically connected to a power source, the stacked structure formed by the two coil layers 51 and 52 allows currents generated by the power source to be evenly distributed to the coil layers 51 and 52, thereby reducing the skin effect. Furthermore, the distribution of the magnetic field lines around the two coil layers 51 and 52 is effected by the width of each coil segment of the coil layer 51 and the width of each coil segment of the coil layer 52, whereby the skin effect may be reduced. In other embodiments, the coil layer 52 may also be replaced with a magnetic material or a graphite layer.

Since each coil segment of the coil layer 51 and each coil segment of the coil layer 52 have different widths, the magnetic field energy can be concentrated to generate a tip discharge effect, so the magnetic flux transmission distance of the wireless charging coil 50 is longer than that of the wireless charging coil 10 due to the tip discharge effect.

Figure 8:
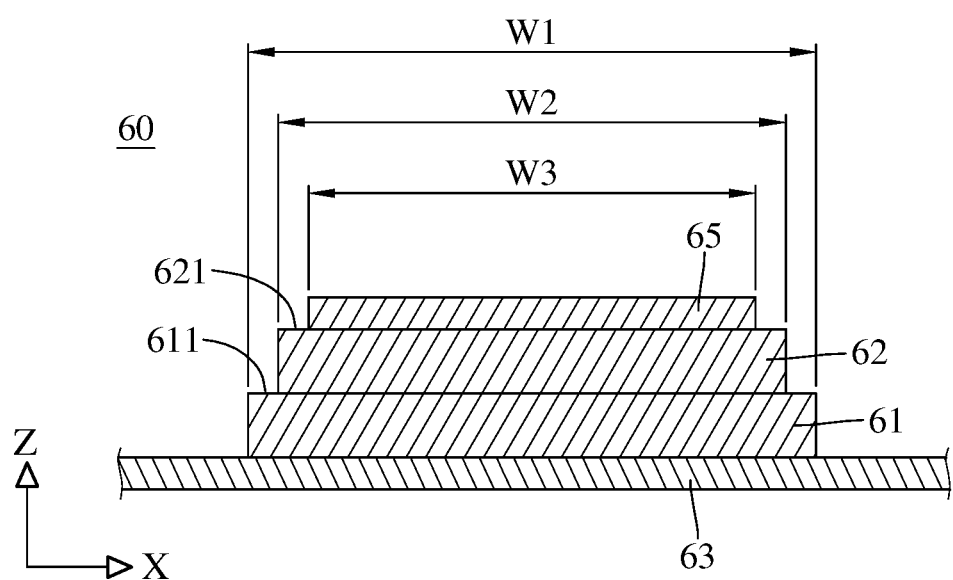
FIG. 8 is a cross section view of a coil segment of a wireless charging coil in accordance with a sixth embodiment of the present disclosure.

FIG. 8 is a cross section view of a coil segment of a wireless charging coil in accordance with a sixth embodiment of the present disclosure. As shown in FIG. 8, a wireless charging coil 60 includes two coil layers 61 and 62, a first magnetic material 63, and a graphite layer 65. The two coil layers 61 and 62 are made of a copper with an identical thickness, the two coil layers 61 and 62 have the same winding path, but each coil segment of the coil layer 61 and each coil segment of the coil layer 62 have a width W1 and a width W2 respectively, wherein the width W1 is greater than the width W2. A magnetic material 63 may be, for example, a ferrite or a nanocrystal. In other embodiments, the thicknesses of the coppers of the two coil layers 61 and 62 may be different. The coil layer 62 is stacked on a surface 611 of the coil layer 61 along the Z-axis direction, and the graphite layer 65 is stacked on a surface 621 of the coil layer 62 along the Z-axis direction. The winding path of the graphite layer 65 is the same as the winding path of the coil layer 61 but each segment of the graphite layer 65 has a width W3, wherein the width W1>width W2>width W3. A signal guiding member is electrically connected to the two coil layers 61 and 62 and disposed between the first magnetic material 63 and the coil layer 61. A width of the first magnetic material 63 is greater than the width of the coil layer 61 and the width of the coil layer 62, and a thickness of the first magnetic material 63 is smaller than a thickness of the coil layer 61. In other embodiments, the thickness of the first magnetic material 63 may be greater than or equal to the thickness of the coil layer 61. In other embodiments, the graphite layer 65 may also be replaced with a magnetic material.

Because each coil segment of the coil layer 61, each coil segment of the coil layer 62, and each coil segment of the graphite payer 65 have different widths, the magnetic field energy also can be concentrated to generate the tip discharge effect, and the magnetic flux transmission distance of the wireless charging coil 60 is longer than that of the wireless charging coil 50.

In another embodiment, a signal guiding member of the wireless charging coil passes through two coil layers vertically (along the Z-axis direction) and electrically connected to the two coil layers.

In other embodiments, a developer may make the thickness of each coil layer of the stacked structure unequal according to different usage requirements, or use a magnetic resonance coil to achieve the stacked structure.

Table 1 is a comparison table of current density and resistance of a conventional charging wireless coil and the wireless charging coil of our present invention. A person skilled in this art knows that the skin effect mainly occurs in an alternative current (AC) state. Under the condition of the same coil thickness (0.2 mm) and the same magnitude of current (1 A), the conventional wireless charging coil is formed by only one coil layer and the wireless charging coil of our present invention is formed by a plurality of coil layers. As shown in Table 1, a resistance of the conventional wireless charging coil in the alternative current (AC) state is 1.5 times that in a direct current (DC) state, so the percentage of resistance difference between in the AC state and in the DC state is 50%. It is apparent that the skin effect has a serious effect on the conventional wireless charging coil. On the contrary, a resistance of the wireless charging coil of our present invention in the AC state is 1.3 times that in a direct current (DC) state, so the percentage of resistance difference between in the AC state and in the DC state is 30%. It can be seen that the wireless charging coil provided by our present invention indeed reduces the percentage of resistance difference between in the AC state and in the DC state, so the wireless charging coil provided by our present invention can reduce the skin effect.

TABLE 1

|  | Current (A) | Resistance (mΩ) |
|---|---|---|
| Conventional wireless charging coil in DC state | 1 | 100 |
| Conventional wireless charging coil in AC state (100 kHZ) | 1 | 150 |
| Our wireless charging coil in DC state | 1 | 96 |
| Our wireless charging coil in AC state (100 kHz) | 1 | 130 |

In conclusion, the wireless charging coil of the present disclosure has the coil stacked structure. When the wireless charging coil is connected to the power source, the coil stacked structure distribute the currents to each of the coil layers evenly for reducing the skin effect. In this way, the coil stacked structure may reduce the skin effect even under high voltage, high frequency or high current working conditions. Compared with current wireless charging coils in the market, the wireless charging coil of the present disclosure has higher current transmission efficiency and lower manufacturing cost due to the reduction of the skin effect.

Although the present disclosure has been disclosed above in the foregoing embodiments, it is not intended to limit this invention. It is within the scope of this invention to be modified and modified without departing from the spirit and scope of the invention. Please refer to the attached claims for the scope of protection defined by the present invention.

What is claimed is:

1. A wireless charging coil, comprising:
a first coil layer;
a second coil layer stacked in parallel on a surface of the first coil layer to form a coil stacked structure, and a width of the first coil layer is greater than a width of the second coil layer;
a first magnetic material disposed on a surface of the first coil layer and having a width larger than the width of the first coil layer and the width of the second coil layer, with said surface away from the second coil layer; and
a signal guiding member electrically connected to the first coil layer and the second coil layer;
wherein currents of a power source are evenly distributed to the first coil layer and the second coil layer to reduce a skin effect when the wireless charging coil is electrically connected to the power source through the signal guiding member.

2. The wireless charging coil in claim 1, wherein the first coil layer and the second coil layer are made of an identical conductive material.

3. The wireless charging coil in claim 1, wherein the first coil layer and the second coil layer have an identical thickness.

4. The wireless charging coil in claim 1, wherein a thickness of the first magnetic material is less than a thickness of the first coil layer or the second coil layer.

5. The wireless charging coil in claim 1, further comprising a graphite layer stacked on a surface of the second coil layer away from the first coil layer, with the graphite layer having a winding path identical to the winding path of the second coil layer.

6. The wireless charging coil in claim 5, wherein a thickness of the graphite layer is less than a thickness of the first coil layer or the second coil layer.

7. The wireless charging coil in claim 1, further comprising a second magnetic material stacked on a surface of the second coil layer which is away from the first coil layer, and the second magnetic material having a winding path identical to the winding path of the second coil layer.

8. The wireless charging coil in claim 7, wherein a thickness of the second magnetic material is less than a thickness of the first coil layer or the second coil layer.

9. The wireless charging coil in claim 1, wherein the signal guiding member is connected between the first magnetic material and the first coil layer.

* * * * *